(12) United States Patent
Richter

(10) Patent No.: US 8,000,373 B2
(45) Date of Patent: Aug. 16, 2011

(54) METHODS AND APPARATUS FOR GENERATING RGB LASER LIGHT

(75) Inventor: Dale A. Richter, Sandia Park, NM (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 297 days.

(21) Appl. No.: 12/059,277

(22) Filed: Mar. 31, 2008

(65) Prior Publication Data

US 2009/0129413 A1    May 21, 2009

Related U.S. Application Data

(60) Provisional application No. 60/989,266, filed on Nov. 20, 2007.

(51) Int. Cl.
*H01S 3/082* (2006.01)
(52) U.S. Cl. .... 372/97; 372/92; 372/29.022; 372/29.02; 372/11; 372/10
(58) Field of Classification Search .......... 372/97, 372/92, 29.022, 29.02, 11, 10
See application file for complete search history.

(56) References Cited

U.S. PATENT DOCUMENTS

| | | | | |
|---|---|---|---|---|
| 5,675,596 A | * | 10/1997 | Kong et al. | 372/25 |
| 5,854,802 A | * | 12/1998 | Jin et al. | 372/22 |
| 7,596,156 B2 | * | 9/2009 | Cotteverte et al. | 372/26 |
| 2004/0047375 A1 | * | 3/2004 | Rodin et al. | 372/10 |
| 2009/0201957 A1 | * | 8/2009 | Brotherton-Ratcliffe | 372/29.022 |
| 2009/0304033 A1 | * | 12/2009 | Ogilvy et al. | 372/10 |

OTHER PUBLICATIONS

Extended Search Report in counterpart European Application No. 08169507.4, dated Oct. 5, 2009.

* cited by examiner

*Primary Examiner* — Kinam Park
(74) *Attorney, Agent, or Firm* — Edell, Shapiro & Finnan, LLC

(57) ABSTRACT

A dual-cavity single longitudinal mode (SLM) laser oscillator generates a pulsed laser signal having a long pulsewidth, long coherence length, and good shot-to-shot energy stability. The laser oscillator has a first cavity between an output coupler and a rear mirror and a second cavity between the output coupler and an intra-cavity mirror disposed between the output coupler and rear mirror. High-loss cavity optics and a passive Q-switch achieve a very high number of round trips that reduce the number of cavity modes down to two or three. The dual cavity design further discriminates between the remaining modes and allows SLM operation. The laser oscillator and an amplifier can be used as a pump laser for a laser system that generates red, green, and blue pulses for holographic recording. A wavelength conversion stage uses optical parametric amplifier(s), doubling crystals, and sum-frequency mixers to produce RGB light from the pump pulses.

25 Claims, 8 Drawing Sheets

METHODS AND APPARATUS FOR GENERATING RGB LASER LIGHT

CROSS REFERENCE TO RELATED APPLICATION

This application claims priority from U.S. Provisional Patent Application Ser. No. 60/989,266 entitled "Method of Achieving RGB Laser Light for Digital Holography," filed Nov. 20, 2007. The disclosure of this provisional patent application is incorporated herein by reference in its entirety.

BACKGROUND

Several technologies have been suggested to achieve the three visible colors of light needed for digital holography. Digital holography requires markedly different properties than the more common Red, Green, Blue (RGB) technology incorporated in various display technologies. Most notably, the pulse width required to develop the multilayer RGB films used in digital holography far exceeds the 5-10 ns pulse widths commonly employed in the display technology. Other key properties required for digital holography include long coherence length, stable shot-to-shot pulse energies, and better pointing stability. An RGB laser technology developed for the display market does not translate to the requirements needed by this demanding digital holography application. Accordingly, there remains a need for a practical RGB laser useful for applications such as film exposure in digital holography.

SUMMARY

Described herein is a dual-cavity, single longitudinal mode (SLM) laser oscillator that generates a pulsed laser signal having a long pulsewidth, long coherence length, and good shot-to-shot energy stability and pointing stability suitable for use in a laser system for generating RGB laser light for holographic recording. The laser oscillator includes a first cavity formed between an output coupler and a rear mirror and a second cavity formed between the output coupler and an intra-cavity mirror disposed between the output coupler and rear mirror along the same optical axis. High-loss cavity optics (the output coupler has a low reflectivity) and a passive Q-switch combine to achieve a very high number of round trips of the laser light within the cavity, thereby reducing the number of cavity modes down to two or three. The dual cavity design further discriminates between the remaining modes and allows SLM operation. This laser oscillator arrangement achieves SLM operation without the need for seeding, resulting in a cost effective design.

The laser oscillator output can be amplified and used as a pump input to a laser system for generating red, green, and blue (RGB) laser pulses suitable for holographic recording. The RGB laser system includes a wavelength conversion stage having non-linear optics such optical parametric amplifier(s) and sum-frequency mixers as well as doubling crystals for converting the pump pulse energy into red, green, and blue wavelength pulses. An optical parametric amplifier converts pulses at the pump wavelength to pulses at a signal wavelength provided by a seeder. A sum frequency mixer generates red wavelength pulses by combining pump wavelength pulses with signal wavelength pulses. Blue wavelength pulses can be generated in a similar manner by frequency doubling the signal pulses prior to sum-frequency mixing with the pump pulses. Green wavelength pulses can be generated by frequency doubling the pump wavelength pulses. A variety of different configurations can be used to generate the RGB light pulses, and certain components can be used in the generation of more than one color, such as the pump laser, seeder, optical parametric amplifier, and cavity optics.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

The system describe herein includes a laser oscillator that achieves single longitudinal mode (SLM) operation with stable shot-to-shot pulse energy and a long pulsewidth, a cavity-less optical parametric amplifier (OPA), and post-mixing stages to generate laser pulses at suitable wavelengths (e.g., red, green, and blue or "RGB") for performing holographic recording.

Figure 1:
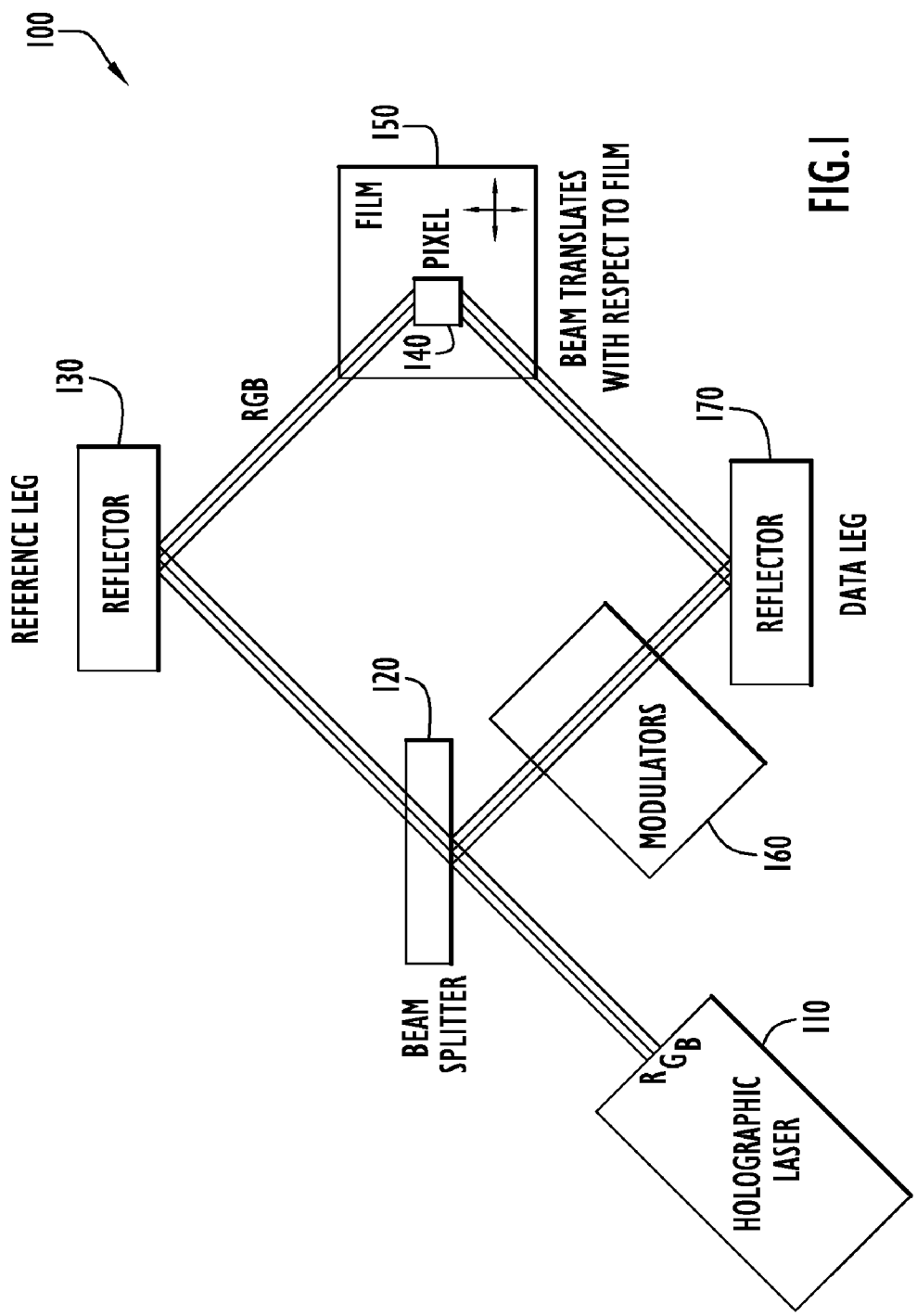
FIG. 1 is a block diagram illustrating an interferometer-based digital holography recording system for exposing holographic RGB film.

A simplified block diagram of a digital holographic recording system 100 for exposing RGB holographic film is shown in FIG. 1. A holographic laser 110 periodically generates a set of three pulses at the red wavelength (632.6 nm), green wavelength (532 nm), and blue wavelength (450 nm) for exposing a holographic film 150. The pulses in each RGB pulse set can be generated substantially simultaneously in parallel. Film 150 can have, for example, a number of layers which are respectively exposed by red, green, and blue light. Recording system 100 essentially operates as an interferometer. In particular, the RGB laser pulses are split into two beam sets by a beam splitter 120, which then travel along two respective paths and are recombined to form an interference pattern on film 150. One RGB beam set travels along a reference leg, which is directed onto a pixel 140 of film 150 by a reflector 130. The other RGB beam set travels along a data leg, where modulators 160 modulate the red, green, and blue pulses with data. The data applied to the pulses can be derived from a digital image or from a computer generated model, for example. The modulators essentially modify the wavefront of each color pulse in a particular manner according to the data to produce the desired interference pattern at the pixel location on the film. The modulated RGB pulses are directed onto pixel 140 to form three respective interference patterns (one for each color) with the un-modulated RGB reference pulses to expose film 150 at the location of pixel 140. By forming three such interfere-grams at each pixel location, a holographic image can be formed on film 150. A single pixel, for example, can be exposed using a single "shot," i.e., a single set of RGB pulses issuing from laser 110. By sequentially translating the beams with respect to the film, different pixel locations can be exposed, whereby a series of laser "shots" exposes a respective series of pixels such that exposure proceeds pixel-by-pixel (e.g., either a beam focusing element or the film can be mounted on a moveable carriage to achieve relative movement of the film).

Proper exposure of holographic film using an interferometer system such as that shown in FIG. 1 requires a source laser with precise pointing stability that generates pulses with a relatively long pulse width and a long coherence length, as well as minimal fluctuations in shot-to-shot pulse energy. These operating requirements distinguish an RGB laser suitable for holographic recording from a typical RGB laser used in display technologies.

With regard to pulse width, standard 5-10 ns pulsed lasers and continuous wave (CW) lasers are typically used in display technologies. Significantly longer pulse widths (e.g., 25-100 ns) are generally required to properly expose holographic film, depending on the chemistry and reaction time of the film materials.

A standard non-line-narrowed YAG laser source provides a sub-centimeter coherence length. However, to produce an interference pattern over practical distances, a coherence length of several centimeters is needed to keep the path lengths of the interferometer properly working together to form the desired interference pattern on the film. The longer the coherence length of the laser pulses, the more relaxed the tolerances on the path length within the optics of the interferometer of the exposure system can be. Conversely, the shorter the coherence length, the tighter the path length tolerances must be.

A conventional solid-state laser having an Nd:YAG (neodymium-doped yttrium aluminum garnet; $Nd:Y_3Al_5O_{12}$) crystal lasing medium in a cavity may experience about 5% to 10% rms fluctuations in pulse energy resulting in changes in the pulse energy from one pulse to the next (or "shot-to-shot" energy fluctuations). In the context of digital holography, such fluctuations correspond to different exposure levels from pixel to pixel. To produce a more uniform exposure and a more consistent appearance of the overall holographic image, significantly better shot-to-shot energy stability is required.

In a holographic recording system, any beam pointing or alignment error of the light issuing from the laser propagates through the optics of the interferometer and results in angular registration errors in focusing the beams on a desired center point on the film. The greater the optical distance between the laser and the film, the greater the angular registration error caused by a certain pointing error. Better pointing stability allows for longer path lengths and relaxed tolerances within the optics of the interferometer. A standard laser may have a pointing stability of about 100 microradians. For a practical holographic recording system, much better pointing stability is desired.

Figure 2:
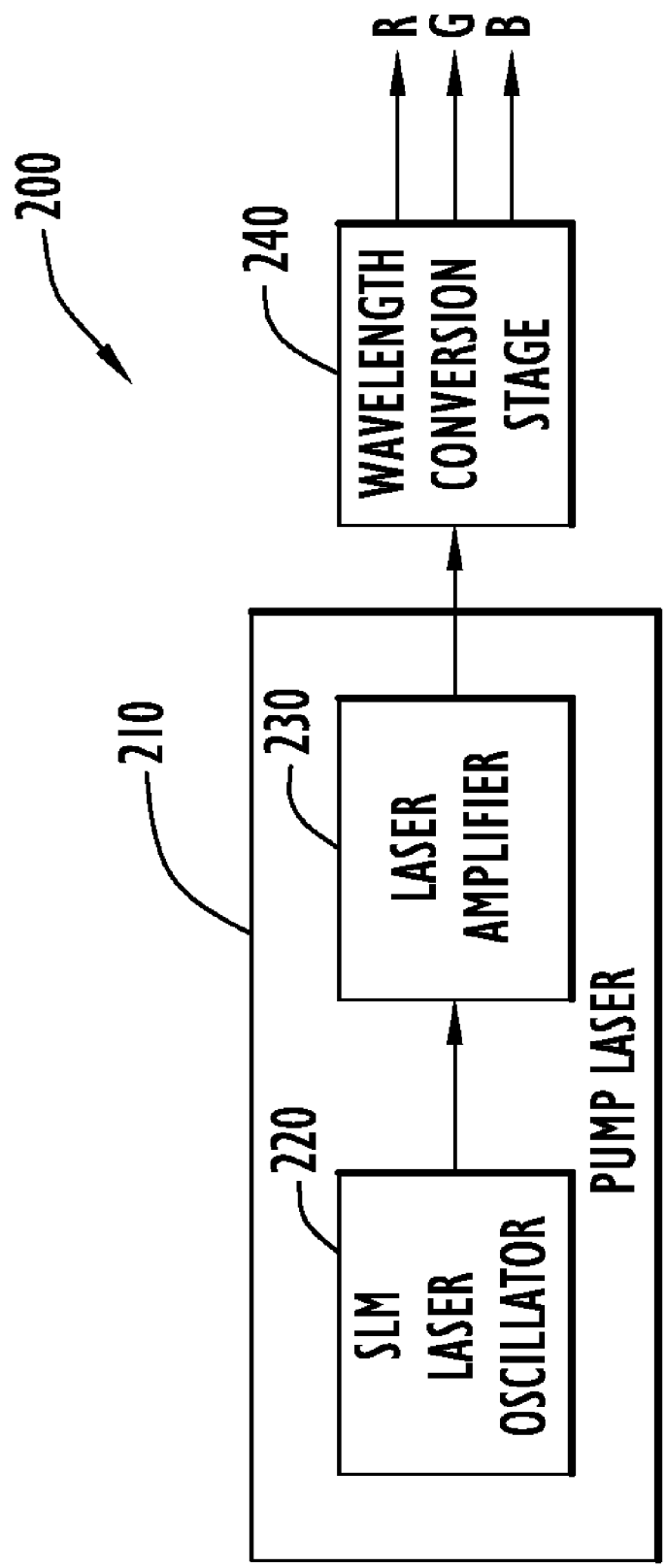
FIG. 2 is a top level block diagram of a laser system for generating light pulses at three wavelength (e.g., red, green, and blue).

FIG. 2 is a top level block diagram of a laser assembly 200 for generating RGB pulses suitable for a holographic recording system according to an embodiment of the invention. The system comprises a pump laser 210 and a wavelength conversion stage 240. Pump laser 210 includes a single longitudinal mode (SLM) dual-cavity laser and a laser amplifier 230. Wavelength conversion stage 240 includes suitable non-linear generation stages for producing output pulses at red, green, and blue wavelengths from the pump laser pulses.

Figure 3:
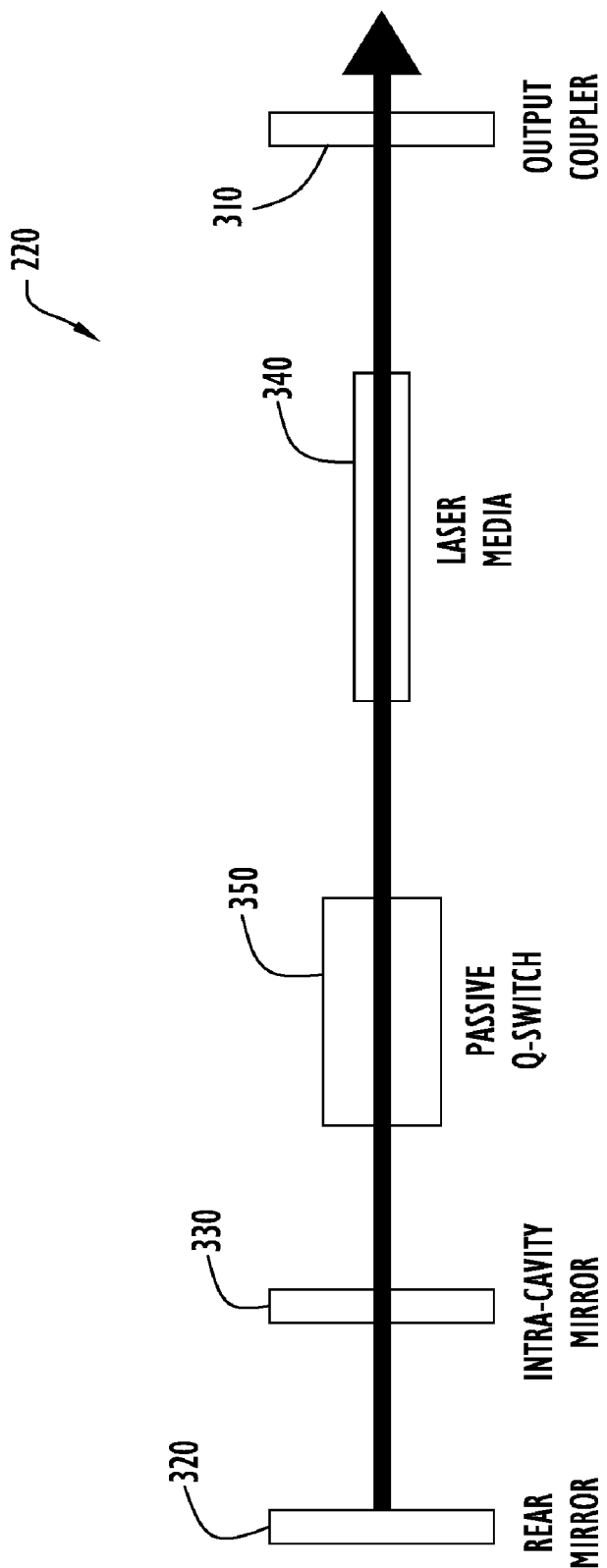
FIG. 3 is a block diagram of a dual cavity single longitudinal mode (SLM) pump laser according to an embodiment of the invention.

FIG. 3 is a more detailed block diagram illustrating a stable, dual cavity SLM laser oscillator 220 capable of generating long pulsewidth pulses (e.g., 25 to 100 ns) and coherence lengths on the order of centimeters. A first, longer cavity is formed between an output coupler 310 and a rear mirror 320, and a second shorter cavity is formed between output coupler 310 and an intra-cavity mirror 330, which is positioned in the beam path between output coupler 310 and rear mirror 320 along a common optical axis with output coupler 310 and rear mirror 320. A passive Q-switch 350 and the laser media 340 are disposed in the beam path between output coupler 310 and intra-cavity mirror 330. Laser media 340 can be an Nd:YAG crystal operating at a wavelength of 1064 nm, for example. Laser oscillator 220 can be a non-seeded laser oscillator as explained below in greater detail.

The features of high-loss cavity optics and a passive Q-switch in a pulsed laser oscillator combine to achieve a very high number of round trips (greater than 1,000) of the laser light photons within the cavity, which reduces the number of cavity modes down to two or three. The dual cavity design then further discriminates between the remaining modes and this allows single longitudinal mode (SLM) operation. In particular, a high-loss cavity design results from a reduced reflectivity of output coupler 310. By way of a non-limiting example, output coupler 310 can be designed to have less than 30% reflectivity at the pump wavelength (i.e., more than 70% of the energy is transmitted out of cavity). Optionally, output coupler can be designed to have less than 20% reflectivity at the pump wavelength (i.e., more than 80% of the energy is transmitted out of cavity). Optionally, output coupler can be designed to have less than 10% reflectivity at the pump wavelength (i.e., more than 90% of the energy is transmitted out of cavity). The passive Q-switch is essentially a saturable absorber, which remains dark until the beam has achieved a certain fluence, and then becomes clear above that fluence level. This characteristic allows the power to be contained until it reaches a certain level (i.e., until there are sufficient passes through the cavity). This configuration of the Q-switch and a high-loss cavity design results in the high number of passes through the cavity and reduces the number of modes down to two or three as a result. A two or three mode laser output is generally unacceptable for applications such as holographic imaging, since the modes beat off of each other and temporally produce very jagged mode-beating pulses whose intensities in time fluctuate with a severe oscillation. In other words, the competition between the modes produces an unstable light intensity which varies unacceptably from shot-to-shot.

The dual-cavity design shown in FIG. 3 is configured to achieve further mode discrimination for SLM operation by canceling out all but one mode. By reducing the number of modes to a single longitudinal mode, very good shot-to-shot energy stability and a smooth temporal pulse profile can be achieved. In particular, rear mirror 320 is fully reflective, while intra-cavity mirror 330 has a reflectivity designed to achieve about an equal distribution of energy between the two mirrors, so that the contribution of the intra cavity mirror is about 50%. An intra-cavity mirror reflectivity between 30% and 40% (e.g., about 36%) has been found to produce this result, for example. By moving the intra cavity mirror along the beam path (toward or away from the rear mirror), a position can be found that results in the unwanted adjacent mode(s) being tuned out (canceled). In the dual laser cavity configuration shown in FIG. 3, for example, the intra-cavity laser mirror provides a C/2L discrimination against the adjacent mode.

To ensure that the laser oscillator maintains a fixed wavelength over time, the mechanical stability of the cavity length must be addressed by controlling the temperature, making mechanical adjustments, or both. For example, a very stable water supply can be applied to the laser rod to keep the laser media and the cavity length as stable as possible. Without such measures, a fixed wavelength cannot be maintained over time, since the cavity length changes, and the laser mode-hops to a different wavelength. This wavelength shift is mostly attributed to the thermal variations of the laser gain material. Depending on the application, a certain amount of mode jumping and wavelength changes may be tolerable. Even without temperature control, digital holography application may be able to tolerate the very small mode hop associated with the described dual cavity since the absorption band of the film can be large.

The described SLM laser oscillator is unusual in that it does not require a seeder, which can cost thousands of dollars. Due to the cavity design and the high number of round trips of laser light, the passive Q switch initially turns on just in the middle of the beam, so that the passive Q switch acts as a spatial filter which spatially cleans up the beam over many passes. As previously explained, the extra intra-cavity mirror then tunes out the unwanted remaining modes to produce single longitudinal mode output pulses. A typical seeded SLM laser has a high gain system with an optimized output coupler. Such a laser may include an electro-optic Q-switch rather than a passive Q-switch. SLM operation can be achieved in such a system only by injecting into the cavity a seed signal at the desired frequency, such as light from a CW laser, which causes the laser energy from the laser media to adopt the seed frequency. The requirement for a seed laser makes this approach very expensive, however. In contrast, for the small cost of one extra intra-cavity mirror, the above-described dual cavity laser oscillator can accomplish SLM operation.

By way of a non-limiting example, the energy of an output pulse of laser oscillator 220 can be about 3 milli-Joules with a pulse diameter of about 600 or 700 microns. These output pulses are supplied to laser amplifier 230 which passes the beam through a gain medium to increase the pulse energy. The amplifier can comprise any suitable gain medium such as more Nd:YAG rods, a fiber amplifier, etc. The resulting pulses at the output of the pump laser 210 have an energy of about 50 milli-Joules at a pulse repetition rate of about 350-360 Hertz, for example. Due to the SLM operation, these pulses have a pulsewidth, coherence length, and shot-to-shot energy stability suitable for use in holographic recording.

Figure 4:
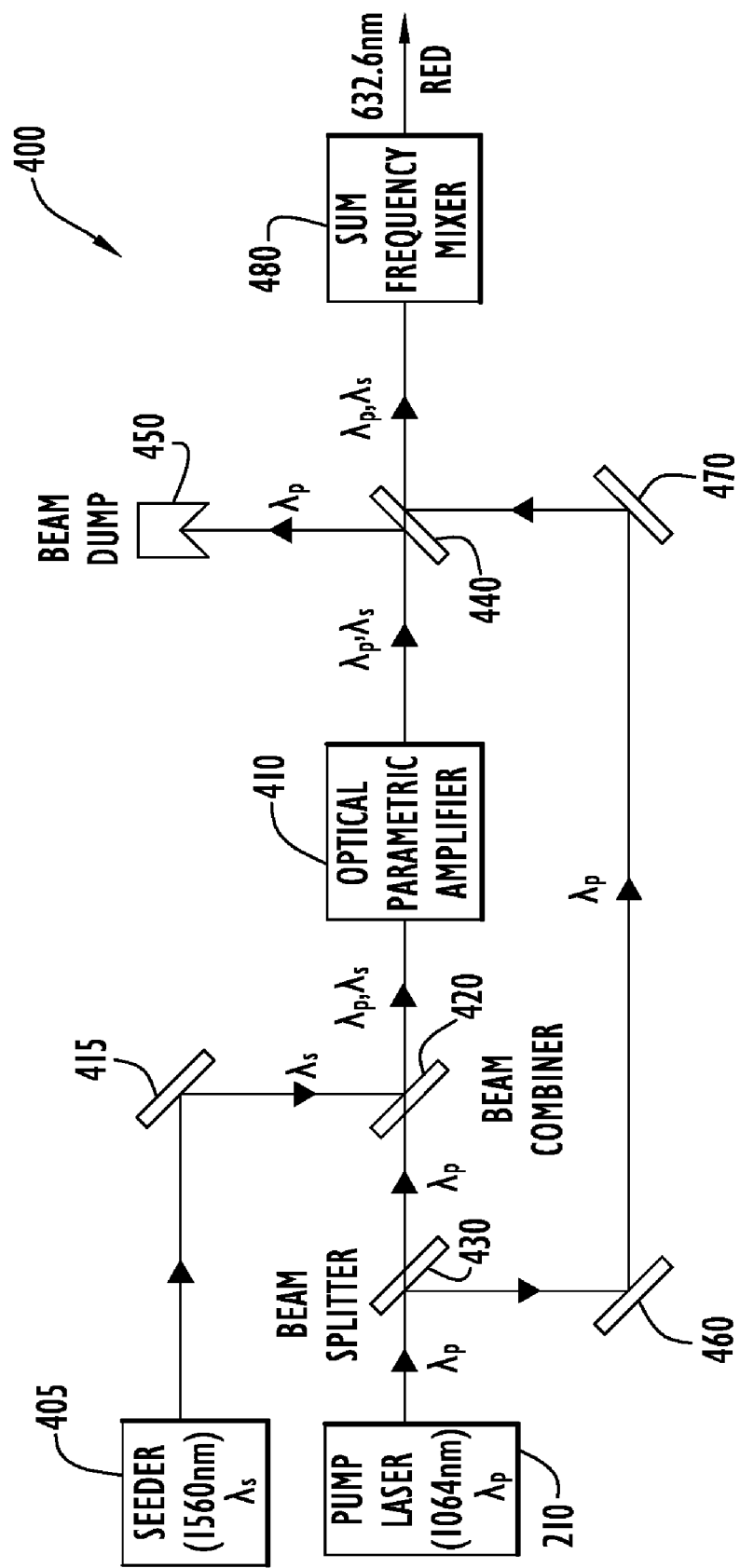
FIG. 4 is a block diagram of a laser assembly for generating red light pulses using an optical parametric amplifier and a sum-frequency mixing stage.

Referring again to FIG. 2, the next stage of the laser assembly 200 is the wavelength conversion stage 240, which includes non-linear optical (NLO) generation stages such as optical parameter amplification and sum-frequency mixing to produce desired wavelengths from the input pump laser pulses (which have a wavelength of 1064 nm, for example). FIG. 4 conceptually illustrates one possible arrangement 400 for generating output pulses with a wavelength of 632.6 nm (red light). Note that beam shaping lenses can be used throughout the assemblies shown in the figures, but have been omitted from the drawings for simplicity. Pump laser 210 supplies pulses at the pump wavelength ($\lambda_P$) to a single pass optical parametric amplifier (OPA) 410, which a non-linear medium capable of parametric amplification. Optionally, a portion of the pump laser beam can be reflected by beam splitter 430 and bypasses OPA 410 for recombining downstream with the output of the OPA 410, as explained in greater detail below. A seeder 405, such as a CW laser diode, supplies a seed signal at a desired output signal wavelength ($\lambda_S$), e.g., 1560 nm, which is directed to a beam combiner 420 via reflector 415 and combined with the pump beam at the input of OPA 410. Notably, seeder 405 can be an off-the-shelf telecom laser that very effectively narrows the linewidth and stakes the signal wavelength for stable operation.

The non-linear medium of OPA 410 can comprise one or more non-linear optical crystals formed of any crystalline material capable of producing parametric output, including, but not limited to: potassium tetanal phosphate (KTP), potassium tetanal arsenate (KTA), lithium niobate (LiNbO$_3$), periodically poled lithium niobate (PPLN), potassium niobate (KNbO$_3$), silver gallium selenite (AgGaSe$_2$), and silver gallium sulfide (AgGaS$_2$). In the system shown in FIG. 4, optical parametric amplifier 410 can be a single-pass, cavity-less arrangement in which pulses pass through the non-linear medium a single time (i.e., no oscillation in a cavity). Alternatively, however, a multi-pass OPA cavity arrangement can be used.

As the pump beam propagates through the non-linear crystal(s), photons at the pump wavelength are converted into photon pairs at two longer wavelengths, resulting in two lower-energy beams at these two wavelengths, conventionally denoted as the signal wavelength and the idler wavelength. The sum of the frequencies of the signal and idler beams equals the frequency of the pump beam (or equivalently, $1/\lambda_P=1/\lambda_S+1/\lambda_I$, where $\lambda_I$ is the idler wavelength). By tuning the angle of the non-linear crystal, the energy can be selectively apportioned between the signal and idler beams. Since the idler beam is not of interest in generating the desired wavelengths, the idler beam is not shown in the figures for simplicity. Seeder 405 pre-loads the non-linear crystal with the desired signal wavelength ($\lambda_S$), such that upon a single pass of a pump pulse through the OPA, much of the pump pulse energy at 1064 nm is converted to energy at the signal wavelength of 1560 nm. At the output of OPA 410, reflector 440 can reflect energy at the pump wavelength to a beam dump 450 while transmitting the output pulse at the signal wavelength. The portion of the input pump beam diverted by beam splitter 430 upstream of OPA 410 can be directed by reflectors 460 and 470 to reflector 440 and combined with the output signal beam downstream of OPA 410.

The signal beam from OPA 410 and the bypassed pump beam are then supplied to sum frequency mixer 480 which produces a 632.6 nm wavelength pulse (red light) from the 1064 nm wavelength pump pulse and the 1560 nm wavelength signal pulse. Sum frequency mixer 480 comprises another non-linear optical crystal such as a PPLN crystal which also obeys the conservation of momentum relationship, i.e., $1/\lambda_P+1/\lambda_S=1/\lambda_{RED}$ (1/1064 nm+1/1560 nm=1/633 nm). However, in this case, photons at the longer pump and signal wavelengths are combined to produce photons at the shorter red wavelength, resulting in an output pulse at the red wavelength (in the OPA, the opposite process occurs, where shorter wavelength photons are split into two longer wavelength photons). In other words, as the name sum-frequency mixer suggests, the frequency of the red output pulse is the sum of the frequencies of the input pump and signal pulses.

Any residual pump and signal energy issuing from sum-frequency mixer 480 can be removed by suitable mechanisms (e.g., reflected out of the beam path to a beam dump).

Sum-frequency mixing stage 480 contributes to the improved performance for the exposure of the holograms when the OPA output (in this case at the signal wavelength) is mixed with another wavelength (in this case the pump wavelength) in a nonlinear crystal to generate each final color (in this case red). Two significant effects occur via this mixing. First, the sum-frequency mixing stage 480 is set up to saturate the final output through proper choice of crystal length for the light intensities present and thus can achieve a notable (two to three times) reduction in the shot-to-shot peak energy fluctuation (essentially a clamping effect). Second, the pump mixing beam that is combined with the OPA output signal beam must have temporal overlap to generate an efficient product at the desired wavelength. When the beams are combined, a variation in the temporal distribution can occur. The final red and blue products (the arrangement for generating blue light is described below) can actually achieve a temporal squaring of the final pulse. Both of these effects, temporal squaring and shot-to-shot energy reduction, can greatly improve the overall uniformity of the hologram production process during the exposure.

In the arrangement shown in FIG. 4, pump energy combined with the signal energy in sum frequency mixer 480 is a "clean" signal that bypassed OPA 410, and thereby avoided any distortions such as scattering and temporal effects that may occur in OPA 410. Using this bypass pump beam leads to a better, cleaner output red wavelength pulse. However, depending on operating requirements and the architecture of the frequency conversion stage, it may be possible to dispense with the pump beam bypass and simply use the residual pump beam issuing from the OPA for mixing with the signal beam in the sum-frequency mixer. Referring again to FIG. 4, in this case, beamsplitter 430 and reflectors 440, 460, and 470 can be eliminated and the pump and signal output beams from OPA 410 are supplied to sum-frequency mixer 480. A splitter to a beam dump for the pump beam could then be placed downstream of sum-frequency mixer 480. Again, the degradation resulting from using the pump beam that passed through the OPA rather than a clean pump beam that bypassed the OPA may not be significant in many circumstances.

Figure 5:
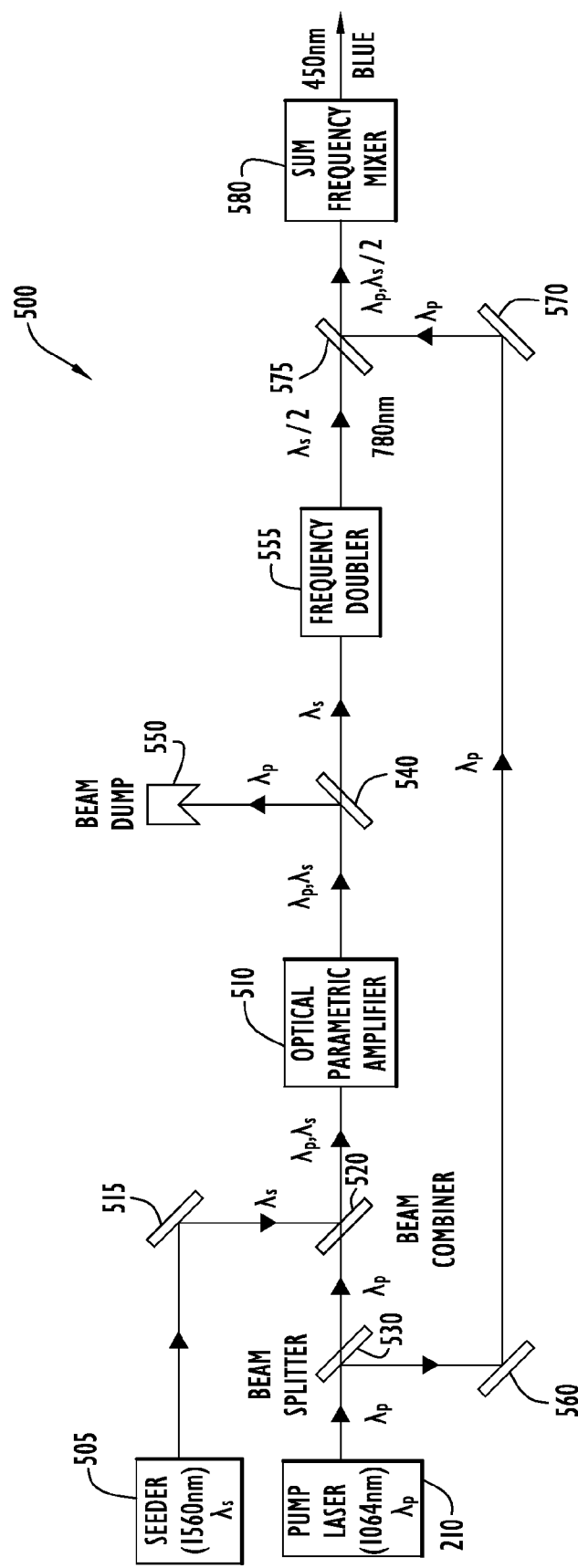
FIG. 5 is a block diagram of a laser assembly for generating blue light pulses using an optical parametric amplifier, a frequency doubling stage, and a sum-frequency mixing stage.

FIG. 5 conceptually illustrates one possible arrangement 500 for generating output pulses with a wavelength of 450 nm (blue light). As with the red wavelength arrangement shown in FIG. 4, in FIG. 5 a pump laser 210 supplies pulses at the pump wavelength ($\lambda_P$) to a single pass optical parametric amplifier (OPA) 510. Optionally, a portion of the pump laser beam can be reflected by beam splitter 530 and bypasses OPA 510 for recombining downstream for sum-frequency mixing. A seeder 505, such as a CW laser diode, supplies a seed signal at a desired output signal wavelength ($\lambda_S$), which is directed to a beam combiner 520 via reflector 515 and combined with the pump beam at the input of OPA 510.

The OPA converts the pump pulse energy at 1064 nm to energy at the signal wavelength of 1560 nm. At the output of OPA 510, reflector 540 can reflect energy at the pump wavelength to a beam dump 550 while transmitting the output pulse at the signal wavelength. The output signal beam is supplied to a frequency doubler 555, which can be a second harmonic generator such as a type I-XY LBO SFG crystal, for example. Frequency doubler 555 produces an output beam with a wavelength that is half of the signal wavelength ($\lambda_S/2$), e.g., 780 nm.

The portion of the input pump beam diverted by beam splitter 530 upstream of OPA 510 can be directed by reflectors 560 and 570 to beam combiner 575 and combined with the frequency doubled signal beam downstream of frequency doubler 555. Note that, as in the case of the red pulse generator, the pump beam issuing from OPA 510 can be used instead of a clean, bypassed portion of the pump beam, resulting in some possible degradation but eliminating the need for the bypass optics. However, in this case, only the signal beam is frequency doubled, so that the pump beam must still bypass frequency doubler 555.

The frequency-doubled signal beam and the pump beam are supplied to sum frequency mixer 580 which produces a 450 nm wavelength pulse (blue light) from the 1064 nm wavelength pump pulse and the 780 nm wavelength frequency-doubled signal pulse. Any residual pump and frequency-doubled signal energy issuing from sum-frequency mixer 580 can be removed by suitable mechanisms (e.g., reflected out of the beam path to a beam dump).

An alternative approach to generating a blue wavelength pulse is to mix a portion of the red wavelength pulse (633 nm) generated via the scheme shown in FIG. 4 with a portion of the pump pulse (1560 nm) in a subsequent sum-frequency mixing stage.

Figure 6:
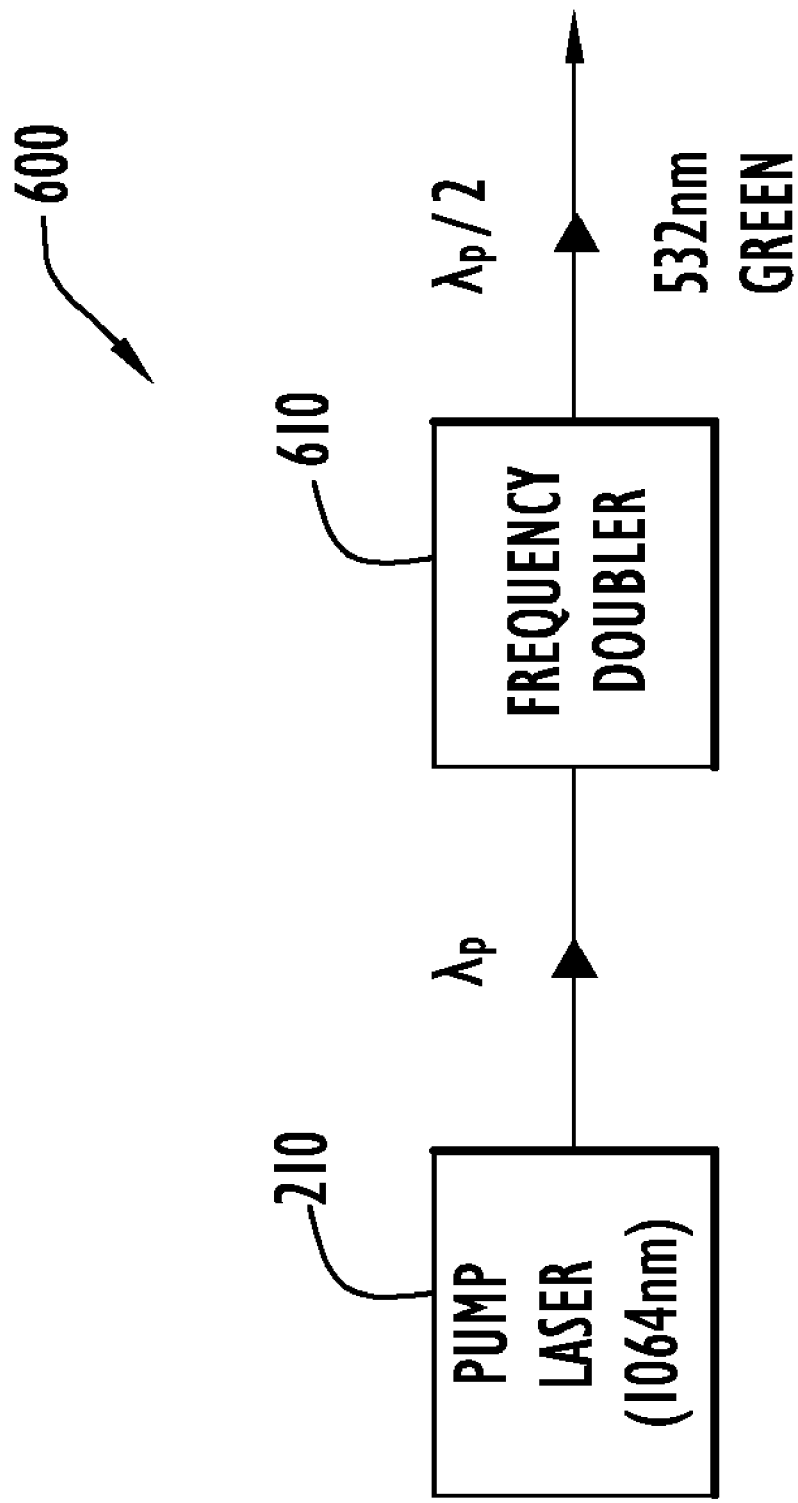
FIG. 6 is a block diagram of a laser assembly for generating green light pulses using a frequency doubling stage.

FIG. 6 illustrates an arrangement 600 for generating a green wavelength output pulse. A pump laser 210 supplies pulses at the pump wavelength ($\lambda_P$) to a frequency doubler 610 which produces an output beam with a wavelength that is half of the pump wavelength ($\lambda_P/2$), i.e., 532 nm, which is the green wavelength.

While FIGS. 4-6 conceptually show three separate assemblies for generating red, green, and blue light pulses, it will be appreciated that many of the components can be used in common to generate the RGB output pulses. For example, three separate pump lasers could be used for the red, green, and blue paths, respectively, or a single pump laser could be used to simultaneously supply pump beams to all three paths using beam splitters. Another option would be to use two pump lasers, with one of the pump laser outputs being split in two to create three total pump beams. Separate seeders could be used to seed separate OPAs for the red and blue paths or one seeder could be used to supply seed signals to both the red and blue paths. Likewise, two separate optical parametric amplifiers could be used for the red and blue paths or the same OPA could be used for both paths. As previously noted, the blue pulses could be generated by beam splitting the generated red pulses and performing an additional sum-frequency mixing with the pump pulses. Thus, it will be appreciated that the invention is not limited to any specific architecture for generating the red, green, and blue wavelength pulses.

Figure 7:
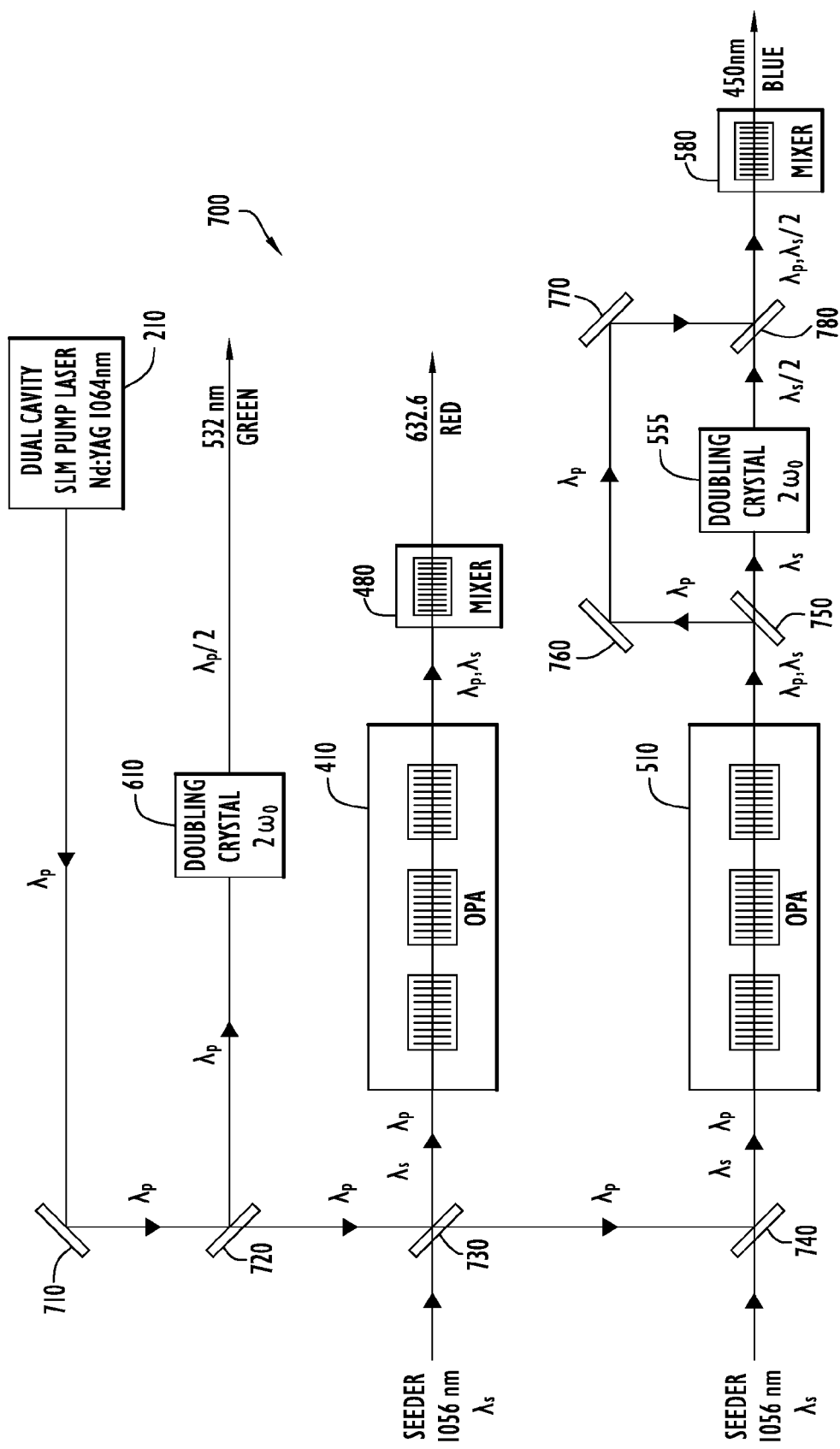
FIG. 7 is a block diagram illustrating one implementation of a three-wavelength laser assembly in which a single pump laser is used to generate red, green, and blue wavelength pulses.

FIG. 7 illustrates one possible scheme for implementing the RGB laser system. Here, a single dual cavity, SLM pump laser (e.g., Nd:YAG at 1064 nm) can be used to supply pump pulses to each of the green, red, and blue paths via reflector 710, beam splitters 720, 730, and reflector 740. In particular beam splitter 720 supplies a portion of the pump beam to the green path, where doubling crystal 610 generates green pulses by doubling the frequency, i.e., halving the wavelength to 532 nm. Beam splitter 730 directs a portion of the pump beam to the red path. A seed signal passes through beam splitter 730 and is supplied along with the pump beam to OPA 410 and sum-frequency mixer 480 to generate red wavelength output pulses, as previously described (here, the pump signal issuing from the OPA is used in the mixer, so the pump bypass is omitted).

Finally, reflector 740 directs the remaining portion of the pump beam to the blue path. A seed signal passes through reflector 740 and is supplied along with the pump beam to OPA 510 which generates pulses at the signal wavelength.

The signal beam is frequency doubled and supplied along with the pump beam to sum-frequency mixer 580, which generates the blue wavelength pulses as previously described. Note that the pump beam issuing from OPA 510 is used for sum-frequency mixing in this case, and reflectors 750, 760, 770, and 780 are used to allow the pump beam to bypass the doubling crystal before being rejoined with the frequency doubled signal beam.

Figure 8:
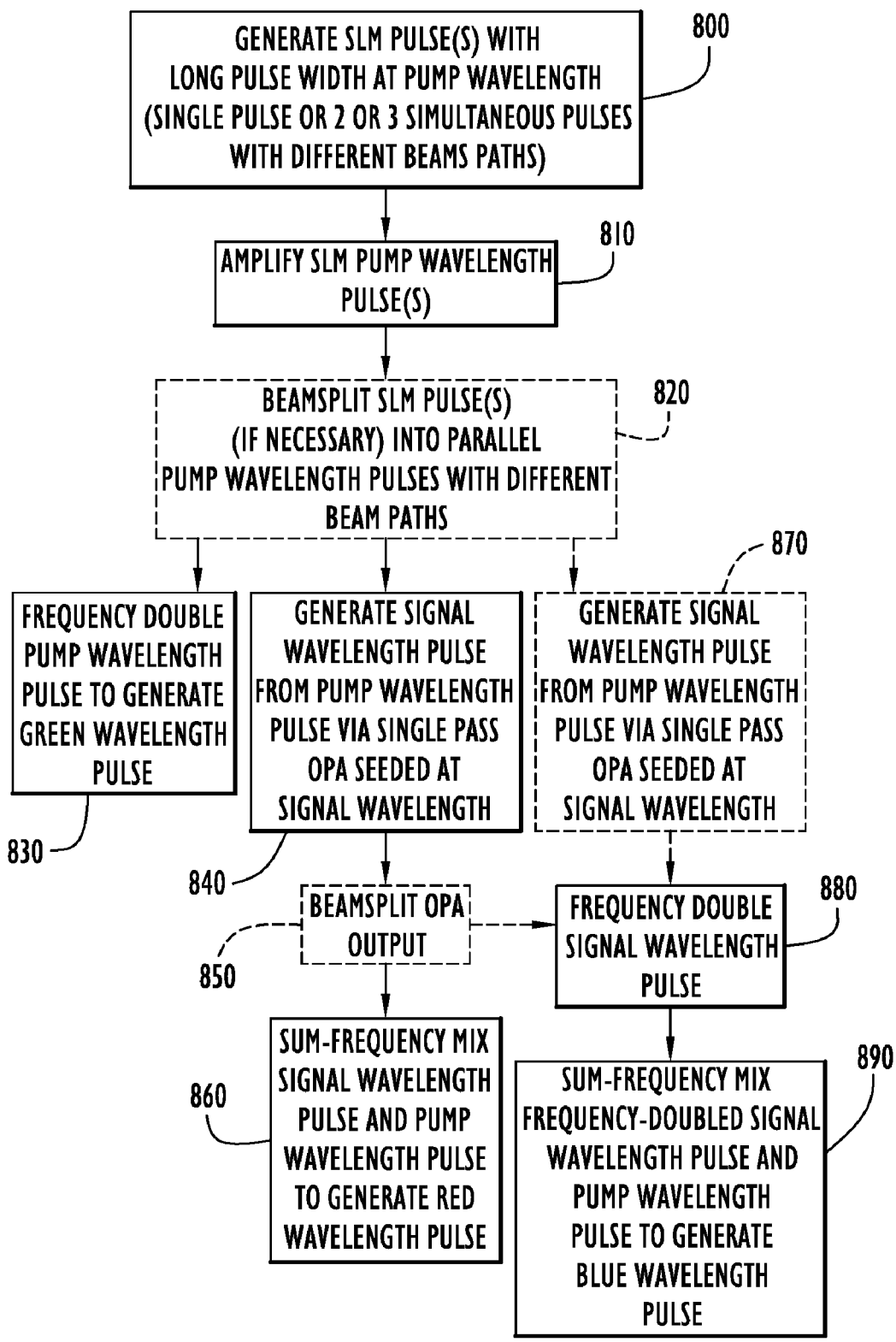
FIG. 8 is a flow chart illustrating a process of generating laser light pulses at three wavelengths.

Operation of the RGB laser system is summarized in the flow chart of FIG. 8, illustrating a few different options in the process. In operation 800, a single longitudinal mode (SLM) pulse with a long pulsewidth is generated at the pump wavelength. As suggested by FIG. 8, either a single sequence of pulses can be generated by a single SLM laser oscillator and later split into three separate pump beams or three (or possibly two) simultaneous sequences of pump pulses can be generated in parallel by different laser oscillators. In operation 810, the pump pulse(s) are amplified. Depending on whether one or more pulse streams are generated, beam splitting is performed in operation 820 to produce three pump beams for the red, green, and blue paths, respectively.

A green wavelength pulse is generated by frequency doubling the pump wavelength pulse (operation 830). In the red wavelength path, a signal wavelength pulse is generated from the pump wavelength pulse via optical parametric amplification assisted by seeding at the signal wavelength (operation 840). The signal and pump pulses are sum-frequency mixed to produce the red wavelength pulse (operation 860). Optionally, a portion of the signal pulse can be split at the output of the OPA and used to generate the blue wavelength pulse, as suggested by operation 850. Another option, as indicated by operation 870 in FIG. 8, is to generate the signal wavelength pulse from the pump wavelength pulse via a separate optical parametric amplifier. In either case (operation 850 or operation 870), the signal wavelength pulse is frequency doubled (operation 880) and then sum-frequency mixed with the pump wavelength pulse to generate the blue wavelength pulse. As previously noted, another option would be to mix a portion of the red wavelength pulse with the pump pulse to produce the blue wavelength pulse (not shown in FIG. 8).

The RGB laser pulses generated by the described system are suitable for use in digital holography due to the long pulsewidth, long coherence length, superior shot-to-shot energy stability, and good pointing stability. Nevertheless, the invention is not limited to digital holography applications and can be used in any suitable context, particularly where such properties are useful. More specifically, the dual cavity SLM laser oscillator can be use in a pump laser for any system requiring such properties, whether or not pulses are generated at multiple wavelengths. Likewise, multi-wavelength systems that use wavelengths other than red, green, and blue can potentially benefit from the described dual cavity SLM laser oscillator scheme, and the invention is not limited to any particular wavelengths or number of wavelengths.

Having described embodiments of methods and apparatus for generating RGB laser light, it is believed that other modifications, variations, and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A dual-cavity single longitudinal mode (SLM) laser oscillator for generating a pulsed laser signal, comprising:
an output coupler;
a rear mirror forming a first cavity with the output coupler;
an intra-cavity mirror disposed between the output coupler and the rear mirror along a common axis and forming a second cavity with the output coupler;
a laser medium disposed between the output coupler and the intra-cavity mirror for generating laser light; and
a passive Q-switch disposed between the output coupler and the intra-cavity mirror, the passive Q-switch limiting a number of modes in the laser oscillator to no more than three, wherein the first and second cavities are configured to provide further mode discrimination such that the laser oscillator generates single longitudinal mode laser pulses.

2. The laser oscillator of claim 1, wherein in laser light makes more than 1,000 passes through the laser oscillator.

3. The laser oscillator of claim 1, wherein the output coupler is less than 30% reflective at the wavelength of the laser signal.

4. The laser oscillator of claim 1, wherein the output coupler is less than 10% reflective at the wavelength of the laser signal.

5. The laser oscillator of claim 1, wherein the intra-cavity mirror has a reflectivity that permits an approximately equal distribution of laser energy between the first and second cavities.

6. The laser oscillator of claim 1, wherein the laser oscillator is not seeded.

7. A pump laser, comprising:
the laser oscillator of claim 1; and
an amplifier for amplifying an energy of the SLM laser pulses generated by the laser oscillator.

8. A laser system for generating red, green, and blue (RGB) laser light, comprising:
the pump laser of claim 7; and
a wavelength conversion stage comprising non-linear optics configured to generate red, green, and blue pulses from the pump pulses.

9. The laser system of claim 8, wherein the wavelength conversion stage comprises:
an optical parametric amplifier seeded with laser light at a signal wavelength, the optical parametric amplifier generating signal pulses at the signal wavelength from the pump pulses; and
a sum-frequency mixer configured to generate the red pulses at a red wavelength by sum-frequency mixing the signal pulses and at least a portion of the pump pulses.

10. The laser system of claim 9, further comprising:
a frequency-doubling stage configured to frequency double a portion of the signal pulses; and
a second sum-frequency mixer configured to generate the blue pulses at a blue wavelength by sum-frequency mixing the frequency-doubled signal pulses and at least a portion of the pump pulses.

11. The laser system of claim 9, further comprising:
a second sum-frequency mixer configured to generated the blue pulses at a blue wavelength by sum-frequency mixing a portion of the red pulses and at least a portion of the pump pulses.

12. The laser system of claim 8, wherein the wavelength conversion stage comprises:
an optical parametric amplifier seeded with laser light at a signal wavelength, the optical parametric amplifier generating signal pulses at the signal wavelength from the pump pulses;
a frequency-doubling stage configured to frequency double the signal pulses; and a sum-frequency mixer configured to generate the blue pulses at a blue wavelength by sum-frequency mixing the frequency-doubled signal pulses and at least a portion of the pump pulses.

13. A method of generating a pulsed laser signal, comprising:
generating laser light from a laser medium in a dual-cavity single longitudinal mode (SLM) laser oscillator such that laser light photons propagate through a first cavity formed between an output coupler and a rear mirror and through a second cavity formed between the output coupler and an intra-cavity mirror disposed between the output coupler and the rear mirror along a common axis, the laser light encountering the laser medium and a passive Q-switch positioned between the output coupler and the intra-cavity mirror;
oscillating the laser light through the laser oscillator such that the laser light makes more than 1,000 round trip passes through the laser oscillator before issuing as an SLM pulsed laser signal from the laser oscillator.

14. The method of claim 13, wherein the passive Q-switch limits a number of modes in the laser oscillator to no more than three, and wherein the first and second cavities further mode discrimination to achieve single longitudinal mode operation.

15. The method of claim 13, further comprising:
operating the laser oscillator without seeding the laser oscillator with a seed signal.

16. A method of generating red, green, and blue (RGB) laser light, comprising:
using pulses of the SLM pulse laser signal generated according to claim 13 as pump pulses at a pump wavelength; and
generating red, green, and blue pulses from the pump pulses.

17. The method of claim 16, further comprising:
generating signal pulses at a signal wavelength via optical parametric amplification of the pump pulses; and
sum-frequency mixing the signal pulses with at least a portion of the pump pulses to generate the red pulses.

18. The method of claim 17, further comprising:
frequency doubling a portion of the signal pulses; and
sum-frequency mixing the frequency-doubled signal pulses and at least a portion of the pump pulses to generate the blue pulses.

19. The method of claim 17, further comprising:
sum-frequency mixing a portion of the red pulses and at least a portion of the pump pulses to generate the blue pulses.

20. The method of claim 16, further comprising:
generating signal pulses at a signal wavelength via optical parametric amplification of the pump pulses;
frequency doubling the signal pulses; and
sum-frequency mixing the frequency-doubled signal pulses and at least a portion of the pump pulses to generate the blue pulses.

21. The laser oscillator of claim 1, wherein the intra-cavity mirror has a reflectivity between 30% and 40% at the wavelength of the laser signal.

22. The laser oscillator of claim 1, wherein the intra-cavity mirror is movable along the common axis to cancel unwanted adjacent modes.

23. The method of claim 13, wherein the intra-cavity mirror has a reflectivity between 30% and 40% at the wavelength of the laser signal.

24. The method of claim 13, further comprising:
moving the intra-cavity mirror along the common axis to cancel unwanted adjacent modes.

25. The method of claim 13, wherein the intra-cavity mirror has a reflectivity that permits an approximately equal distribution of laser energy between the first and second cavities.

* * * * *